United States Patent
Li et al.

(10) Patent No.: US 8,289,914 B2
(45) Date of Patent: Oct. 16, 2012

(54) SIGNAL TRANSMISSION METHOD AND APPARATUS USED IN OFDMA WIRELESS COMMUNICATION SYSTEM

(75) Inventors: Hang Li, Beijing (CN); Guanghan Xu, Beijing (CN)

(73) Assignee: Beijing Xinwei Telecom Technology Inc., Beijing (CN)

( * ) Notice: Subject to any disclaimer, the term of this patent is extended or adjusted under 35 U.S.C. 154(b) by 257 days.

(21) Appl. No.: 12/680,667

(22) PCT Filed: Sep. 27, 2008

(86) PCT No.: PCT/CN2008/072580
§ 371 (c)(1),
(2), (4) Date: Mar. 29, 2010

(87) PCT Pub. No.: WO2009/043312
PCT Pub. Date: Apr. 9, 2009

(65) Prior Publication Data
US 2010/0208676 A1  Aug. 19, 2010

(30) Foreign Application Priority Data
Sep. 27, 2007  (CN) .......................... 2007 1 0122581

(51) Int. Cl.
*H04W 4/00* (2009.01)
(52) U.S. Cl. ......... 370/329; 370/341; 370/343; 370/348
(58) Field of Classification Search ........... 370/236, 370/329, 335, 343, 345, 341, 348; 375/221; 455/509; 710/33
See application file for complete search history.

(56) References Cited

U.S. PATENT DOCUMENTS

| | | | | |
|---|---|---|---|---|
| 7,907,958 B2* | 3/2011 | Sampath et al. | ............... | 455/509 |
| 2006/0101168 A1* | 5/2006 | Roh et al. | ......................... | 710/33 |
| 2006/0146920 A1* | 7/2006 | Suh et al. | ....................... | 375/221 |
| 2007/0286081 A1* | 12/2007 | Corazza | ......................... | 370/236 |
| 2008/0144582 A1* | 6/2008 | Das et al. | ........................ | 370/335 |

FOREIGN PATENT DOCUMENTS

| | | |
|---|---|---|
| CN | 1649333 A | 8/2005 |
| CN | 101026604 A | 8/2007 |
| JP | 2007243234 A | 9/2007 |

* cited by examiner

*Primary Examiner* — Hassan Kizou
*Assistant Examiner* — Toan Nguyen
(74) *Attorney, Agent, or Firm* — Baker & Hostetler LLP (57) ABSTRACT

Embodiments of the present invention provide a signal transmission method and apparatus used in an Orthogonal Frequency Division Multiple Access (OFDMA) wireless communication system, to enhance stability of signal transmission and resist time-frequency dispersion. The signal transmission method used in the OFDMA wireless communication system provided by an embodiment of the invention includes: converting an L×1 symbol vector into an N×1 modulating signal vector according to a loading factor fed back by a receiving party, in which value of N is known, both L and N are natural numbers larger than one, N is larger than or equal to L, the loading factor is a ratio of L and N; mapping the N×1 modulating signal vector into N time-frequency grids; and converting the N time-frequency grids into a signal waveform and sending the signal waveform to the receiving party.

15 Claims, 5 Drawing Sheets

SIGNAL TRANSMISSION METHOD AND APPARATUS USED IN OFDMA WIRELESS COMMUNICATION SYSTEM

CROSS-REFERENCE TO RELATED APPLICATIONS

This application is a National Stage of International Patent Application No. PCT/CN2008/072580, filed on Sep. 27, 2008, which claims priority to foreign Patent Application No. CN 200710122581.6, filed on Sep. 27, 2007.

TECHNICAL FIELD

The present invention relates to an Orthogonal Frequency Division Multiple Access (OFDMA) wireless communication system, and more particularly, to a signal transmission method and apparatus used in the OFDMA wireless communication system.

BACKGROUND OF THE INVENTION

In wireless communications, multi-path, fading, and other various interferences constitute major challenges to robust signal transmission. In the OFDMA system, the radio frequency spectrum may be regarded as a plane of two dimensions constituted by time intervals and sub-carriers. Each pair of the time interval and the sub-carrier forms a time-frequency grid which is a basic unit for signal transmission. After the transmission of the time-frequency grids, either channel responses or noise statistics or both may fluctuate. If symbols are transmitted over partial time-frequency grids with either greatly attenuated channel responses or large noise variance, the corresponding symbols may not be able to be recovered. It is unpractical to control power for each time-frequency grid because additional bandwidth is required.

SUMMARY OF THE INVENTION

Embodiments of the present invention provide a signal transmission method and apparatus used in the OFDMA wireless communication system, to enhance the stability of the signal transmission and resist the time-frequency dispersion.

A signal transmission method provided by an embodiment of the present invention includes:
  converting each $L \times 1$ symbol vector into an $N \times 1$ modulating signal vector according to a loading factor fed back by a receiving party, wherein value of N is known, both L and N are natural numbers larger than one, $N \geq L$, the loading factor is $L/N$;
  mapping the $N \times 1$ modulating signal vector into N time-frequency grids;
  converting the N time-frequency grids into a signal waveform and sending the signal waveform to the receiving party.

Another embodiment of the present invention further provides a signal transmission method, including:
  converting a signal waveform received from a sending party into time-frequency grids;
  converting the time-frequency grids into a modulating signal vector;
  recovering the modulating signal vector to a symbol vector;
  calculating a loading factor utilizing the modulating signal vector; and
  negotiating the loading factor with the sending party.

A signal transmission apparatus provided by an embodiment of the present invention includes:
  a vector converter, configured to convert an $L \times 1$ symbol vector into an $N \times 1$ modulating signal vector according to a loading factor fed back by a receiving party, wherein value of N is known, both L and N are natural numbers larger than one, $N \geq L$, the loading factor is $L/N$;
  a mapper, configured to map the $N \times 1$ modulating signal vector into N time-frequency grids; and
  a transmitter, configured to convert the N time-frequency grids into a signal waveform and send the signal waveform to the receiving party.

Another embodiment of the present invention further provides a signal transmission apparatus, including:
  a receiver, configured to convert a signal waveform received from a sending party into time-frequency grids;
  an inverse mapper, configured to convert the time-frequency grids into a modulating signal;
  a demodulator, configured to convert the modulating signal generated by the inverse mapper into a symbol vector; and
  a loading factor generator, configured to calculate a loading factor using the modulating signal generated by the inverse mapper, and negotiate information of the loading factor with the sending party.

With the signal transmission method provided by embodiments of the present invention, the receiving party obtains channel state through detecting received symbols, designs optimal signal transmitting and receiving modes according to obtained channel state, i.e., calculates the value for the loading factor (Actually, the loading factor is L since N is fixed), converts the $L \times 1$ symbol vector into the $N \times 1$ modulating signal vector according to the value of L, so as to self-adaptively adjust pre-coding code rate which is based on linear transformation, and to make the $L \times 1$ symbol vector be transmitted more effectively in the N time-frequency grids. Thus, the stability of signal transmitted in multipath fading and interference channel may be improved and the time-frequency dispersion may be resisted.

EMBODIMENTS OF THE PRESENT INVENTION

To make the objective, technical means and advantages of the invention more clear, detailed descriptions for the invention are further provided in the following accompanying with drawings.

Figure 1:
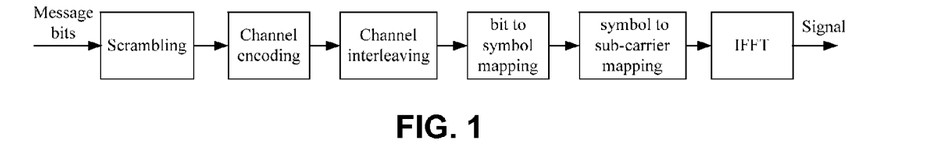
FIG. 1 is a block diagram illustrating an example about OFDMA channel transmission.

FIG. 1 is a block diagram illustrating an example about OFDMA channel transmission. As shown in FIG. 1, in the OFDMA multi-carrier modulation system, signals of a sending party will be processed as follows. Bit vectors are obtained after performing scrambling, signal coding and channel interleaving in sequence for message stream, the bit vector is mapped into a sub-carrier, each bit symbol is mapped into an OFDMA grid, and finally, the OFDMA grid is processed with the Inverse Fast Fourier Transformation (IFFT) and then sent out. Here, each OFDMA grid occupies a certain time interval and sub-carrier. Thus, each OFDMA grid may also be referred to as a time-frequency grid. Subsequently, quality of received symbols greatly depends on the Signal to Noise Ratio (SNR) of a time-frequency grid set allocated for the transmission.

Figure 2:
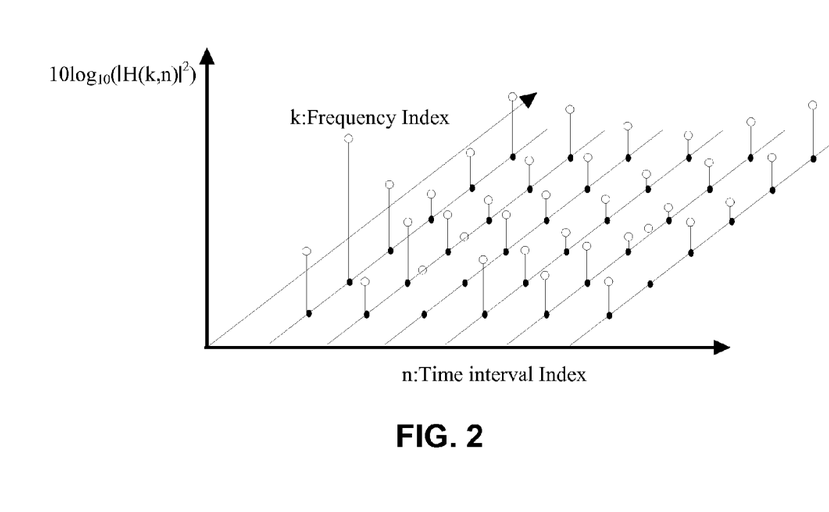
FIG. 2 is a schematic diagram illustrating a dispersion channel response in the time-frequency grid of the OFDMA system.
Figure 3:
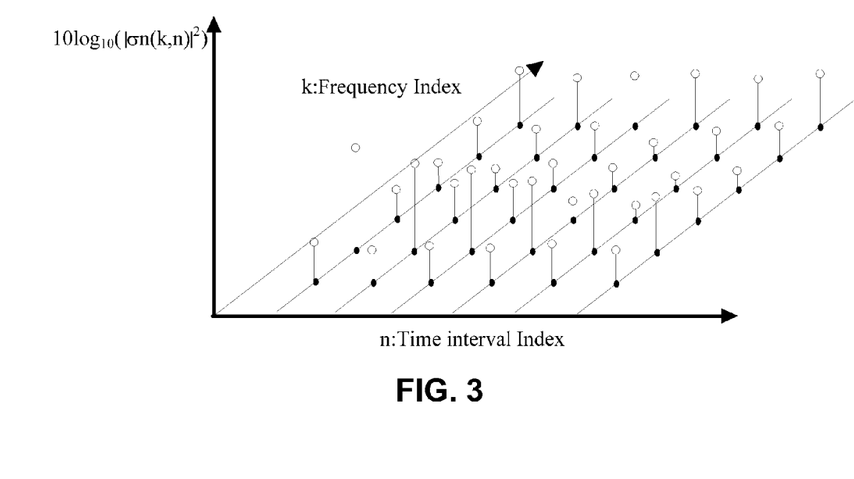
FIG. 3 is a schematic diagram illustrating a dispersion interference variance in the time-frequency grid of the OFDMA system.

FIG. 2 is a schematic diagram illustrating a dispersion channel response in the time-frequency grid of the OFDMA system. FIG. 2 shows a 6*6 time-frequency gridblock. The height of each vertical line represents channel gain of a grid at which the vertical line locates. It can be seen that considerable time-frequency dispersion occurs in this area, which affects the channel gain to some extent. Thus, in a channel state of multipath fading, quick fading of gain may occur in the channel response of partial allocated time-frequency grids. FIG. 3 is a schematic diagram illustrating a dispersion noise interference variance in a time-frequency grid of the OFDMA system. As shown in FIG. 3, in the 6*6 time-frequency gridblock, the height of each vertical line represents a noise interference variance of a grid at which the vertical line locates. Both inter-cell interference and out-of-network interference may introduce the time-frequency dispersion of the noise interference variance.

Figure 4:
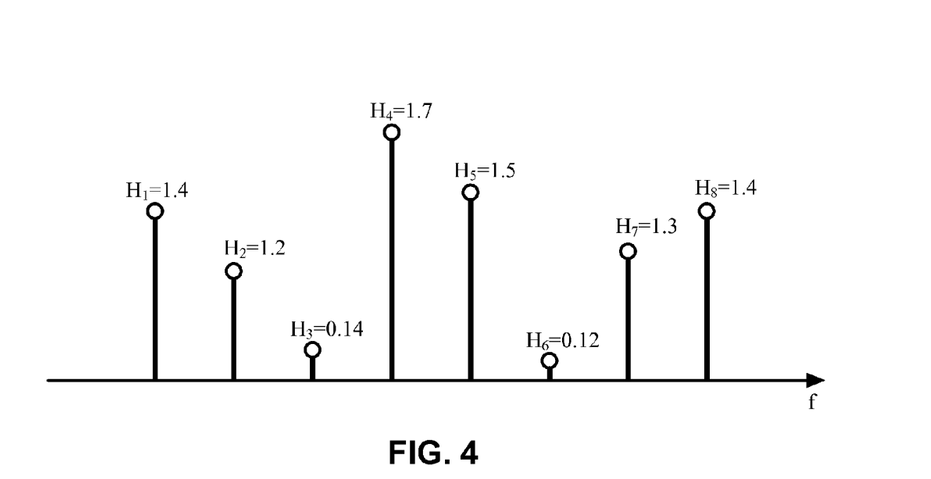
FIG. 4 is a schematic diagram illustrating a channel response of the time frequency grid in the OFDMA system.

FIG. 4 is a schematic diagram illustrating a channel response of the time-frequency grid in the OFDMA system. FIG. 4 shows an exemplary allocation about signals transmitted in eight time-frequency grids, and channel gain of each time-frequency grid. It can be seen from FIG. 4 that the signal gains of different time-frequency grids are obviously different. The highest channel gain may reach 1.7, while the lowest channel gain is merely 0.12. This phenomenon is generated because of the time-frequency dispersion of the channel.

Generally, the time-frequency dispersion channel may be expressed as follows:

$$Y[k,n]=H[k,n]\cdot\sqrt{P_{k,n}}S[k,n]+N[k,n]$$

Y[k,n] denotes a signal received by a receiving party; S[k,n] denotes a signal sent by a sending party. H[k,n] denotes a channel gain; N[k,n] denotes a noise, and $P_{k,n}$ denotes transmission power of the [k,n] grid.

From FIG. 4, it can be seen that compared with an average channel gain, the channel gains of the third and sixth time-frequency grids respectively have terrible fading of −18.9 dB and −20.25 dB. One method for recovering symbols $S_3$ and $S_6$ respectively transmitted on the third and sixth time-frequency grids is calculating the inverse of the channel response at each grid. The method needs to perform power control for each basic symbol. This mechanism not only consumes extra bandwidths when feeding back a power control command, but also sends a signal with higher power. In addition, this method is unpractical to a mobile channel because of the fast time-varied characteristics of the H[k,n]Another method for recovering the faded symbols is to adopt a strong channel coding. While, the strong channel coding will increase the complexity and coding delay of the system Thus, an embodiment of the present invention provides a signal transmission method and apparatus used in the OFDMA wireless communication system, to enhance the stability of the signal transmitted in the time-frequency dispersion channel.

Figure 5:
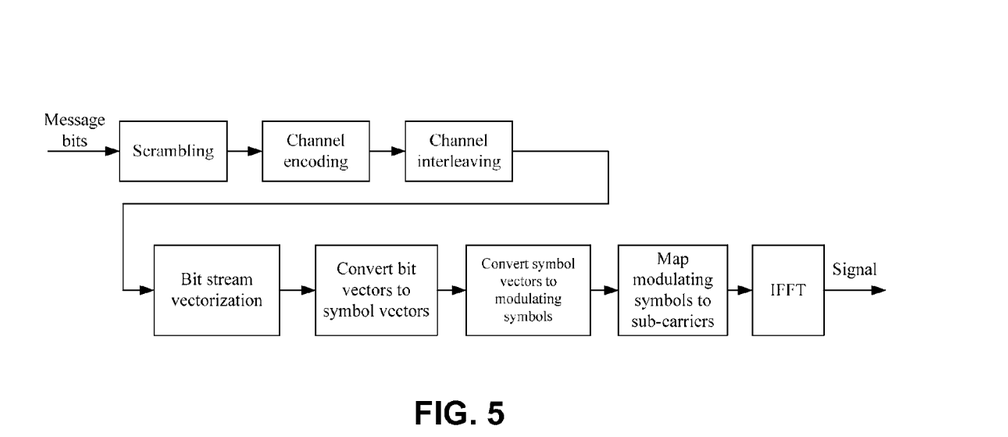
FIG. 5 is a baseband model of a signal transmission method in accordance with an embodiment of the present invention.

FIG. 5 is a baseband model of a signal transmission method in accordance with an embodiment of the present invention. As shown in FIG. 5, in the method, signals of the sending party are processed as follows. A bit vector is obtained after performing scrambling, signal coding and channel interleaving in sequence for message stream. The bit vector is converted into a symbol vector. The symbol vector is extended to a modulating signal vector with more digits utilizing a code spreading processing. The modulating signal vector is mapped into a sub-carrier. Finally, the sub-carrier is sent out after being processed with the IFFT processing The specific blocks may be as follows. Pre-multiplying an L×1 symbol vector by an N×L code spreading matrix, transforming each L×1 symbol vector into an N×1 modulating signal vector, and mapping the N×1 modulating signal vector into an appointed set with N time-frequency grids for transmission.

In addition, the power control will be applied to the whole symbol vector, instead of a single symbol.

Thus, an expression of a receiving signal model is:

$$Y=H\odot\sqrt{P}(W\cdot S)+N$$

P denotes transmission power. Y, H and N respectively denote a received signal, a channel gain and a noise, and are N×1 vectors. ⊙ denotes a Hadamard product. S is an L×1 vector, W is an N×L code separating matrix. Both L and N are natural numbers, and the ratio of L and N is called a loading factor. L is larger than one, N is larger than one, and L is smaller than or equal to N.

Here, it should be noted that once the sending party is determined, N is actually determined. The sending party receives a loading factor fed back by the receiving party, obtains the value of corresponding L according to the value of the loading factor, and self-adaptively adjusts a sending rule according to the value of L. Specifically, the sending rule is adjusted as follows: generating a code spreading matrix according to the value of L, extending L symbol vectors into N modulating signal vectors utilizing the code spreading matrix. Preferably, column vectors of the code spreading matrix W are mutual orthogonal, and all the elements of W have the same amplitude.

With the signal transmission method provided by this embodiment of the present invention, the receiving party detects and obtains the channel state through detecting the received symbols, and calculates the value of the loading factor (Actually, the value of the loading factor is the value of L since N is fixed) according to the channel state, extends the L×1 symbol vector into the N×1 modulating signal vector utilizing the value of L, to make the L×1 symbol vector be transmitted in the N time-frequency grids more effectively. Thus, even if partial assigned time-frequency grids are destroyed because of fading or interference, L symbol vectors may also be recovered.

Figure 6:
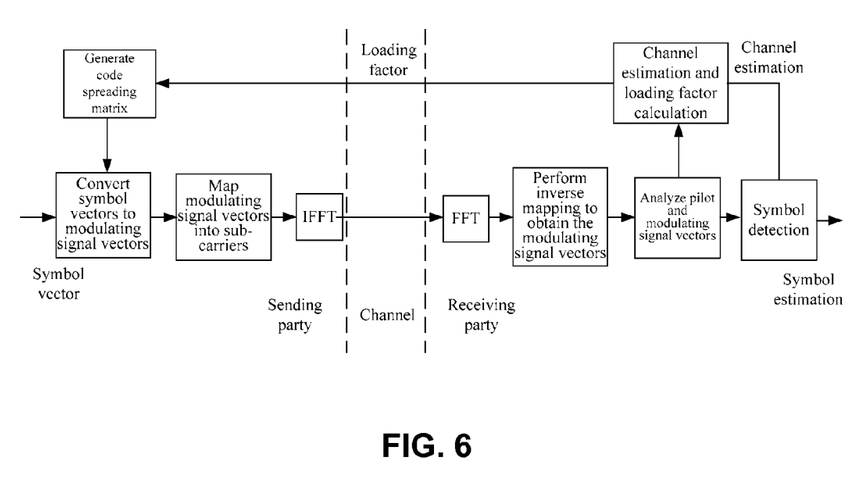
FIG. 6 is a signal transmission block-diagram in a signal transmission method in accordance with an embodiment of the present invention.

FIG. 6 is a signal transmission block-diagram of a signal transmission method in accordance with an embodiment of the present invention. As shown in FIG. 6, at the sending party, the code spreading matrix is generated according to the loading factor fed back by the receiving party. The symbol vector is converted into the modulating signal vector according to the generated code spreading matrix. The modulating signal vector is mapped into time-frequency grids (sub-carrier), the time-frequency grids are converted into a signal waveform, and the signal waveform is sent to the receiving party. The specific method may be as follows. After being processed with the IFFT, the signal waveform is sent to the receiving party via a channel. At the receiving party, the received signal coming from the sending party is converted into a time-frequency grid. The specific method may be as follows. After being processed with the Fast Fourier Transformation (FFT), an inverse mapping is performed for the time-frequency gird obtained after transformation to obtain the modulating signal vector. The symbol vector is obtained by analyzing pilot frequency and modulating signal vector. Meanwhile, channel estimation and calculation of loading factor may be performed, according to the result of analyzing the pilot frequency and modulating signal vector. The loading factor is fed back to the sending party for generating the code spreading matrix. In addition, symbol estimation may be obtained by performing symbol detection for obtained symbol vector according to the result of signal estimation.

The receiving party may recover the symbols with various different signal detection methods. Preferably, a signal detection algorithm based on a Minimum Mean Squared Error (MMSE) may be adopted.

The expression of the typical MMSE signal detection algorithm is:

$$\hat{S}=(PW^*|\Phi|^2 W+R_n)^{-1}\sqrt{P}W^*\Phi^*Y, \Phi=\text{diag}(H)$$

It can be seen that the performance of the MMSE signal detection algorithm relies heavily on a matrix condition of $M=PW^*|\Phi|^2W+R_n$. The more M closes to a diagonal matrix with the same diagonal elements, the better an average symbol SNR after detection. On the other hand, if amplitudes of elements in H fluctuate very large, matrix condition of M will become worse, which also affects the average symbol SNR.

Thus, in order to enhance the stability of the symbol transmission, it is necessary to adjust the loading factor L/N according to channel state of allocated time-frequency grid. At the receiving party, the loading factor may be calculated according to the measuring of the channel response. The loading factor may be reported to the sending party via the feedback channel, so as to make the sending party generate appropriate code spreading matrix. The calculation and reporting of the loading factor must be performed periodically, so as to trace the channel change in time and update the optimal loading factor. Once receiving a new loading factor, the sending party will generate a corresponding code spreading matrix, and converts subsequent symbol vector into the modulating signal vector with the code spreading matrix.

In this embodiment of the present invention, for the given loading factor L/N and number N (N≧L) of the time-frequency grids, the process for generating the code spreading matrix may be as follows. Defining a fundamental matrix $W_N$ for the N×1 modulating signal vector, and removing N-L columns from matrix $W_N$ to obtain the code spreading matrix. In an embodiment of the present invention, the code spreading matrix may be obtained through removing the last N-L columns of the matrix $W_N$. Thus, the code spreading matrix finally obtained is $W_N^L=W_N(:,1:L)$.

For the given N, the loading factor L/N also determines a data speed of the code spreading transmission at the same time. When L decreases, the matrix condition of $PW_N^{L*}|\Phi|^2W_N^L+R_n$ will be improved. Thus, when L/N decreases, the stability of the signal transmission in the time-frequency dispersion channel may be improved. The improvement of the stability is at the expense of data-speed loss. Thus, in a time-varying channel state, appropriate L/N value obtained after calculation is very important for the performance of the signal transmission.

In an embodiment of the present invention, after performing the symbol detection, the optimal value of L/N may be determined according to the loss of Signal to Interference plus Noise Ratio (SINR) compared with the SNR. SINR denotes a bias between the detected symbol and ideal symbol.

The optimal loading factor may guarantee the largest signal transmission speed and the smallest transmission performance loss under the precondition of a given transmission power.

Thus, for a given SNR and N, the optimal loading factor, e.g., the optimal L, is required to be provided to make the signal transmission speed largest and the performance loss smallest.

For a given signal model $Y(t)=H(t)\square\sqrt{P(t)}(W\cdot S(t))+N(t)$ of the seventh frame, SNR is determined by $P(t)/\sigma_n^2$, and $\sigma_n^2$ is a noise variance. SINR may be obtained according to result of the symbol detection. Generally, SINR is smaller than SNR. The performance loss of SINR compared with SNR may be defined as follows: SnrLoss(t)=SNR(t)−SINR(t). Generally, SnrLoss(t) is a function of the loading factor, channel characteristics and SNR.

In actual mobile environment, since the channel changes with time, different frames correspond to different SINR for the same L and SNR. Thus, it is a more practical method to calculate the optimal loading factor according to statistic data obtained by adding up channel characteristics of multi-frame. Compared with the method of calculating SnrLoss with instantaneous SINR of each frame, it is more practical to calculate SnrLoss with the statistic data of SINR.

In an embodiment of the present invention, for each combination of L and SNR, supposing data of N frames is collected, and SINRs corresponding to the N frames are calculated. Thus, channel state measurements corresponding to the N frames may be calculated. The set of the N channel state measurements may be referred to as a channel state measurement set. A threshold, referred to as two-dimensional statistic data, is selected from a channel state measurement set of each combination. The threshold is larger than or equal to a measurement of P % in the instantaneous channel state measurement set. P is a value predefined by the system, ranging from 1 to 100, and the preferable value of P is 90. The threshold may also be an average value of all the measurements in the instantaneous channel state measurement set. Thus, multiple two-dimensional statistic data may be obtained for multiple combinations of L and SNR. Thus, the SnrLoss(SNR,L) may be obtained according to a two-dimensional set constituted by the combinations of L and SNR and the two-dimensional statistic data corresponding to each combination in the set, and the optimal loading factor may further be obtained:

$$\text{SnrLoss}(\text{SNR},L)=\text{SNR}-\text{SinrOutage}(L,\text{SNR})$$

The optimal value of L may be calculated according to SnrLoss(SNR,L) and the expression $$L_{opt}(SNR) = \min_L SnrLoss(L, SNR) - 10\log_{10}(L)$$

under certain specific circumstances. The loading factor may be obtained according to the value of L.

In this embodiment of the present invention, the channel state measurements may be the SINR. Then, the two-dimensional statistic data may be the SINR threshold. Supposing data of N frames is collected for each L and SNR, and SINRs corresponding to the N frames are calculated. An SINR threshold, denoted as SinrOutage, is set according to the N SINRs. SinrOutage is larger than or equal to P % of the N SINRs or the average value of the N SINRs. Thus, an SINR threshold may be obtained for each combination of L and SNR. And then multiple SINR thresholds may be obtained for multiple combinations of L and SNR. Thus, SnrLoss(SNR, L) may be obtained according to a two-dimensional set constituted by the combinations of L and SNR as well as the SINR threshold corresponding to each combination in the set.

In this embodiment of the present invention, the channel state measurements may be the performance loss SnrLoss. Then, the two-dimensional statistic data is the SnrLoss threshold. The SnrLoss threshold is larger than or equal to P % of N performance loss values or the average value of the N performance loss values.

Figure 7:
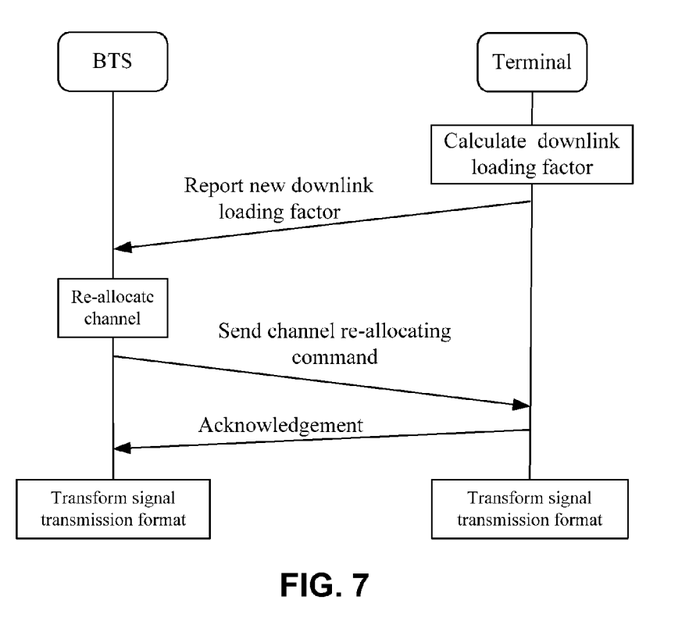
FIG. 7 is a signaling process for updating a downlink loading factor in accordance with an embodiment of the present invention.
Figure 8:
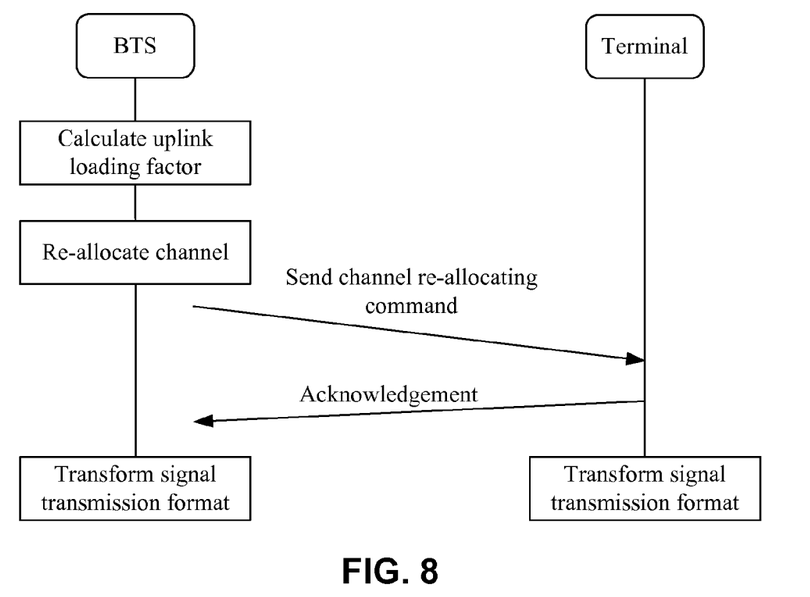
FIG. 8 is a signaling process for updating an uplink loading factor in accordance with an embodiment of the present invention.

As for a wireless system adopting multiple antennas at a Base Transceiver Station (BTS) or a terminal side, the situation of the uplink channel usually differs from that of the downlink channel. Thus, the uplink loading factor and downlink loading factor should be respectively calculated. FIG. 7 is a signaling process for updating a downlink loading factor in accordance with an embodiment of the present invention. As shown in FIG. 7, the terminal side calculates the downlink loading factor and periodically reports the downlink loading factor to the BTS, for reflecting the channel change. Generally speaking, it would be better to calculate the downlink loading factor by the terminal side. FIG. 8 is a signaling process for updating an uplink loading factor in accordance with an embodiment of the present invention. As shown in FIG. 8, the BTS side calculates the uplink loading factor with an uplink service channel. As for the scenes shown in FIGS. 7 and 8, as long as detecting the change of the uplink loading factor and downlink loading factor, the BTS re-allocates a channel for the terminal with the new loading factor. A channel re-allocating command is sent to the terminal to initiate the terminal transmission format negotiation. Once the BTS receives a response acknowledge from the terminal, the transmission format based on the new loading factor comes into effect.

Figure 9:
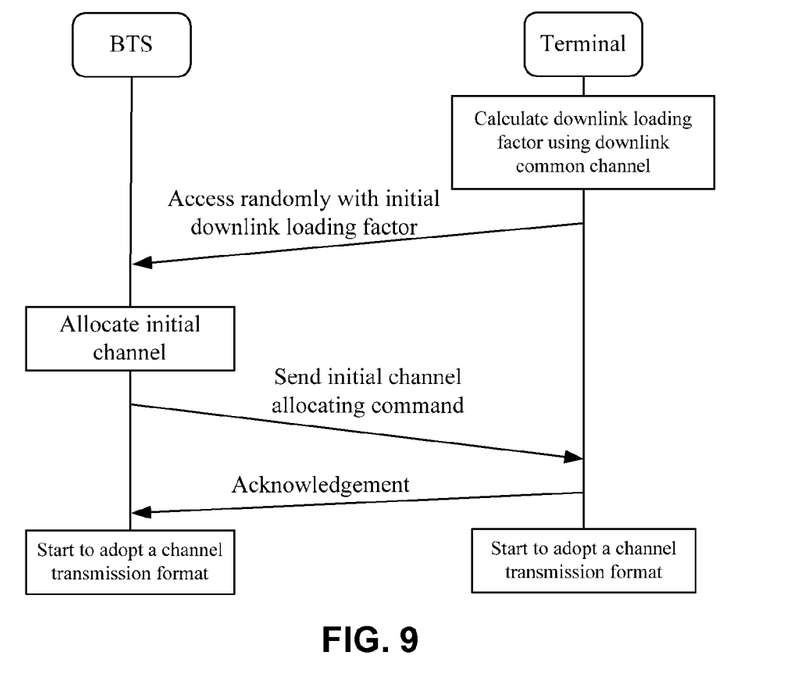
FIG. 9 is a signaling process for determining a downlink loading factor at the stage of initial access in accordance with an embodiment of the present invention.

In the common communication mode, the uplink loading factor and downlink loading factor may be calculated using the data of uplink service channel and downlink service channel. The calculation process of the initial loading factor is introduced hereinafter when the terminal initially accesses. FIG. 9 is a signaling process for determining a downlink loading factor at the stage of initial access in accordance with an embodiment of the present invention. As shown in FIG. 9, before the terminal starts to initially access, the initial downlink loading factor may be calculated using a downlink common channel, such as a broadcasting channel. When the terminal accesses the BTS randomly, the initial downlink loading factor is sent to the BTS. The BTS performs the initial downlink channel allocation using the initial downlink loading factor. The loading factor may also be used for performing the initial uplink channel allocation as the uplink loading factor.

Figure 10:
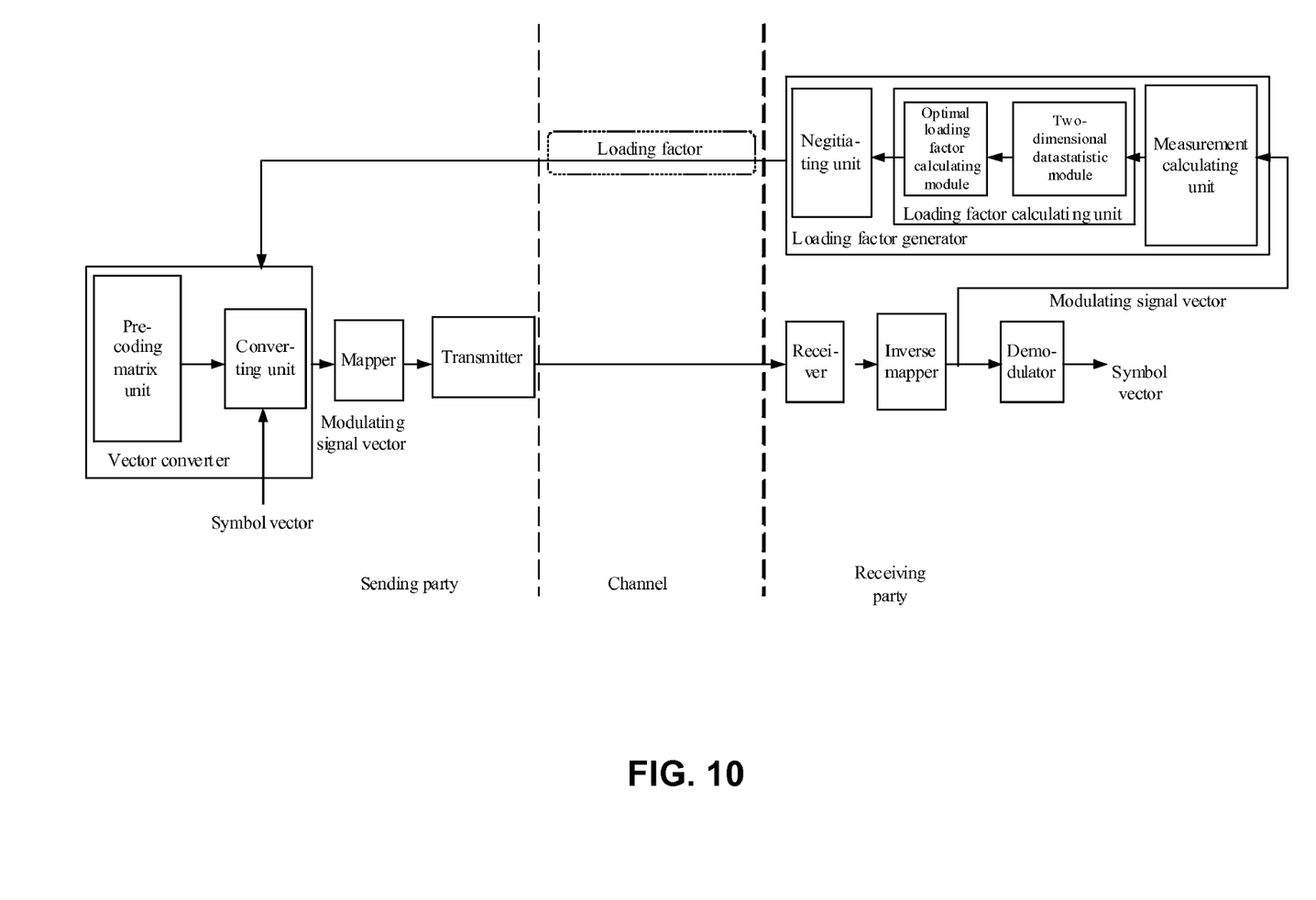
FIG. 10 is a schematic diagram illustrating structure of a signal transmission apparatus in accordance with an embodiment of the present invention.

FIG. 10 is a schematic diagram illustrating structure of a signal transmission apparatus in accordance with an embodiment of the present invention. As shown in FIG. 10, the apparatus includes a vector converter, a mapper and a transmitter located at the sending party, and a receiver, an inverse mapper, a demodulator, and a loading factor generator located at the receiving party.

The vector converter is configured to convert an L×1 symbol vector into an N×1 modulating signal vector according to the loading factor fed back by the receiving party. Both L and N are natural numbers which are larger than one, and N is larger than or equal to L. The loading factor is the ratio of L and N.

The vector converter may include a pre-coding matrix unit and a converting unit.

The pre-coding matrix unit is configured to generate an N×L precoding matrix according to the loading factor fed back by the receiving party. The specific method may be as follows, removing N−L columns from an N×N fundamental matrix. Each column of the precoding matrix is the orthogonal column vector, and all elements of the matrix have the same amplitude.

The converting unit is configured to pre-multiply an L×1 symbol vector by the N×L precoding matrix generated by the pre-coding matrix unit, to convert the L symbols into the N×1 modulating signal vector.

The mapper is configured to map the N×1 modulating signal vector into N time-frequency grids.

The transmitter is configured to convert the N time-frequency grids into a signal waveform and send out the signal waveform.

The receiver is configured to convert the received signal waveform into time-frequency grids.

The inverse mapper is configured to convert the time-frequency grids into the modulation signal according to a mapping rule adopted by the mapper.

The demodulator is configured to convert the modulation signal generated by the inverse mapper into the symbol vector according to a conversion rule adopted by the vector converter.

The loading factor generator is configured to calculate the loading factor according to the modulation signal generated by the inverse mapper, and negotiate the information of the loading factor with the vector converter of the sending party.

The loading factor generator may further include a measurement calculating unit, a loading factor calculating unit and a negotiating unit.

The measurement calculating unit is configured to calculate one or multiple instantaneous channel state measurements. The instantaneous channel state measurement may be the SINR, or the difference between the SNR and the SINR. The SINR may be calculated according to the detected symbols or estimated channel characteristics.

The loading factor calculating unit is configured to calculate the loading factor according to the one or multiple instantaneous channel state measurements calculated by the measurement calculating unit.

The loading factor calculating unit includes a two-dimensional data statistic module and an optimal loading factor calculating module.

The two-dimensional data statistic module is configured to record an instantaneous channel state measurement set corresponding to each combination, according to each selected two-dimensional combination of the L (may be the loading factor) and the SNR, obtain the two-dimensional statistic data of each selected combination according to the instantaneous channel state measurement set. The two-dimensional statistic data is a measurement which is larger than or equal to P % of the instantaneous channel state measurement set.

The optimal loading factor calculating module is configured to calculate the loading factor according to all the selected combinations of L and SNR as well as the two-dimensional statistic data thereof.

The negotiating unit is configured to negotiate the optimal loading factor calculated by the loading factor calculating unit with the vector converter of the sending party, so as to use the optimal loading factor in the subsequent communication.

When the sending party is a base station and the receiving party is a terminal, the terminal calculates current optimal loading factor, and reports the current optimal loading factor to the base station. After receiving the optimal loading factor sent by the terminal, the base station re-allocates a channel or allocates an initial channel with the new optimal loading factor, and sends a channel re-allocating command or an initial channel allocating command to the terminal. The terminal returns an acknowledgement to the base station. Thus, the optimal loading factor is utilized by the signal transmission between the base station and the terminal.

When the sending party is a terminal and the receiving party is a base station, the base station calculates current optimal loading factor, re-allocates channels according to the new optimal loading factor, and sends a channel re-allocating command to the terminal during the normal communication. The terminal returns an acknowledgement to the base station. Thus, the optimal loading factor is utilized by the signal transmission between the terminal and the base station.

The above parts or units may be implemented by all software modules or hardware logic modules which can accomplish the corresponding computation.

Persons having ordinary skill in the art may understand that, the above vector converter, mapper and transmitter located at the sending party may be an independent apparatus, meanwhile the receiver, inverse mapper, demodulator and loading factor generator located at the receiving party may also be an independent apparatus. Certainly, persons having ordinary skill in the art may also understand that, in practical applications, a network device may be either a sending party or a receiving party under different circumstances. Thus, a network device may at the same time possess all the parts or units of the signal transmission apparatus shown in FIG. 10.

The foregoing is only preferred embodiments of the invention, which is not used to limit the protection scope of the invention. Any modifications, equivalent substitutions and improvement within the spirit and principle of the invention, should be covered within the protection scope of the invention.

The invention claimed is:

1. A signal transmission method used in an Orthogonal Frequency Division Multiple Access (OFDMA) wireless communication system, comprising:
converting each L×1 symbol vector into an N×1 modulating signal vector according to a loading factor fed back by a receiving party, the value of N is known, both L and N are natural numbers larger than one, N≧L, the loading factor is L/N;
mapping the N×1 modulating signal vector into N time-frequency grids;
converting the N time-frequency grids into a signal waveform and sending the signal waveform to the receiving party.

2. The method according to claim 1, further comprising:
calculating one or more instantaneous channel state measurement according to detection of received symbols performed by the receiving party; and
calculating the loading factor using the one or more instantaneous channel state measurement, to make the instantaneous channel state measurement reach an extremum and signal transmission speed reach the maximum under transmission power constraint.

3. The method according to claim 2, wherein calculating the loading factor using the one or more instantaneous channel state measurement comprises:

recording an instantaneous channel state measurement set corresponding to each selected two-dimensional combination of L and Signal to Noise Ratio (SNR);
obtaining statistic data of each selected combination according to the instantaneous channel state measurement set, wherein the statistic data is a measurement which is larger than or equal to P % of the instantaneous channel state measurement set, P is a value predefined by a system ranging from 0 to 100; or is an average value of all the measurements in the instantaneous channel state measurement set; and
calculating the loading factor according to all the selected combinations of L and SNR and the statistic data corresponding to each of the selected combinations.

4. The method according to claim 3, wherein the instantaneous channel state measurement is a difference between the SNR and a Signal to Interference plus Noise Ratio (SINR), and the loading factor makes the instantaneous channel state measurement reach the minimum; or the instantaneous channel state measurement is the SINR, and the loading factor makes the instantaneous channel state measurement reach the maximum; and the SINR is calculated according to detected symbols or estimated channel characteristics.

5. The method according to claim 1, wherein converting the L×1 symbol vector into the N×1 modulating signal vector according to the loading factor fed back by the receiving party comprises:
generating an N×L pre-coding matrix according to the loading factor fed back by the receiving party; and
converting L symbols into the N×1 modulating signal vector by pre-multiplying the L×1 symbol vector with the N×L pre-coding matrix generated by a pre-coding matrix.

6. The method according to claim 5, wherein generating the N×L pre-coding matrix according to the loading factor fed back by the receiving party comprises removing N−L columns from an N×N fundamental matrix to obtain the N×L pre-coding matrix.

7. The method according to claim 5, wherein each column of the N×L pre-coding matrix is orthogonal with each other, and all elements of the N×L pre-coding matrix have a same amplitude.

8. The method according to claim 1, wherein converting the N time-frequency grids into the signal waveform and sending the signal waveform to the receiving party comprises performing an Inverse Fast Fourier Transformation (IFFT) on the N time-frequency grids and sending converted signal waveform to the receiving party.

9. A signal transmission method used in an Orthogonal Frequency Division Multiple Access (OFDMA) wireless communication system, comprising:
converting a signal waveform received from a sending party into time-frequency grids;
converting the time-frequency grids into a modulating signal vector;
recovering the modulating signal vector to a symbol vector;
calculating a loading factor utilizing the modulating signal vector; and
negotiating the loading factor with the sending party,
wherein the loading factor is L/N, the value of N is known, L and N are natural numbers larger than one, and N≧L,
wherein calculating the loading factor comprises:
calculating one or more instantaneous channel state measurement according to detection of received symbols performed by a receiving party, and calculating the loading factor using the one or more instantaneous channel state measurement, to make the instantaneous channel state measurement reach an extremum and signal transmission speed reach the maximum under transmission power constraint, and wherein calculating the loading factor using the one or more instantaneous channel state measurement comprises:

recording an instantaneous channel state measurement set corresponding to each selected two-dimensional combination of L and Signal to Noise Ratio (SNR), obtaining statistic data of each selected combination according to the instantaneous channel state measurement set, wherein the statistic data is a measurement which is larger than or equal to P % of the instantaneous channel state measurement set, P is a value predefined by a system ranging from 0 to 100; or is an average value of all the measurements in the instantaneous channel state measurement set, and calculating the loading factor according to all the selected combinations of L and SNR and the statistic data corresponding to each of the selected combinations.

10. The method according to claim 9, wherein converting the signal waveform received from the sending party into time-frequency grids comprises converting the signal waveform received from the sending party into the time-frequency grids with a Fast Fourier Transformation (FFT).

11. The method according to claim 9, wherein the instantaneous channel state measurement is a difference between the SNR and a Signal to Interference plus Noise Ratio (SINR), and the loading factor makes the instantaneous channel state measurement reach the minimum; or the instantaneous channel state measurement is the SINR, and the loading factor makes the instantaneous channel state measurement reach the maximum; and the SINR is calculated according to detected symbols or estimated channel characteristics.

12. The method according to claim 9, wherein converting the time-frequency grids into the modulating signal vector comprises converting the time-frequency grids into the modulating signal vector utilizing a same conversion rule adopted by the sending party, and wherein recovering the modulating signal vector to the symbol vector comprises recovering the modulating signal vector to the symbol vector with a same conversion rule adopted by the sending party.

13. A signal transmission apparatus used in an Orthogonal Frequency Division Multiple Access (OFDMA) wireless communication apparatus, comprising:

a vector converter, configured to convert an L×1 symbol vector into an N×1 modulating signal vector according to a loading factor fed back by a receiving party, the value of N is known, both L and N are natural numbers larger than one, N≧L, the loading factor is L/N;

a mapper, configured to map the N×1 modulating signal vector into N time-frequency grids; and a transmitter, configured to convert the N time-frequency grids into a signal waveform and send the signal waveform to the receiving party.

14. The apparatus according to claim 12, wherein the vector converter comprises:

a pre-coding matrix unit, configured to generate an N×L pre-coding matrix according to the loading factor fed back by the receiving party; and a converting unit, configured to convert L symbols into the N×1 modulating signal vector by pre-multiplying the L×1 symbol vector with the N×L pre-coding matrix generated by the pre-coding matrix unit.

15. A signal transmission apparatus used in an Orthogonal Frequency Division Multiple Access (OFDMA) wireless communication system, comprising:

a receiver, configured to convert a signal waveform received from a sending party into time-frequency grids;

an inverse mapper, configured to convert the time-frequency grids into a modulating signal;

a demodulator, configured to convert the modulating signal generated by the inverse mapper into a symbol vector; and a loading factor generator, configured to calculate a loading factor using the modulating signal generated by the inverse mapper, and negotiate information of the loading factor with the sending party, wherein the loading factor is L/N, the value of N is known, L and N are natural numbers larger than one, and N≧L, wherein the loading factor generator comprises:

a measurement calculating unit, configured to calculate one or more instantaneous channel state measurement according to detection of received symbols performed by a receiving party, a loading factor calculating unit, configured to calculate the loading factor which makes the instantaneous channel state measurement reach the minimum, meanwhile makes signal transmission speed reach the maximum under transmission power constraint, using the one or more instantaneous channel state measurement calculated by the measurement calculating unit, and a negotiating unit, configured to negotiate an optimal loading factor calculated by the loading factor calculating unit with the sending party, and wherein the loading factor calculating unit comprises:

a two-dimensional data statistic module, configured to record an instantaneous channel state measurement set corresponding to each selected two-dimensional combination of L and Signal to Noise Ratio (SNR), and obtain statistic data of each selected combination according to the instantaneous channel state measurement set, wherein the statistic data is a measurement which is larger than or equal to P % of the instantaneous channel state measurement set, P is a value predefined by a system ranging from 0 to 100; or is an average value of all the measurements in the instantaneous channel state measurement set, and an optimal loading factor calculating module, configured to calculate the loading factor according to all the selected combinations of L and SNR and the statistic data corresponding to each of the selected combinations.

* * * * *